United States Patent
Dastugue et al.

(10) Patent No.: US 9,658,085 B2
(45) Date of Patent: May 23, 2017

(54) MEASURING DIMENSIONAL CHARACTERISTICS OF A PRODUCTION PART

(71) Applicant: MESSIER-BUGATTI-DOWTY, Velizy Villacoublay (FR)

(72) Inventors: Jean-Benoit Dastugue, Velizy Villacoublay (FR); Jean-Claude Couchinave, Velizy Villacoublay (FR); Xavier Elizalde, Velizy Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 86 days.

(21) Appl. No.: 14/611,872

(22) Filed: Feb. 2, 2015

(65) Prior Publication Data

US 2015/0219477 A1    Aug. 6, 2015

(30) Foreign Application Priority Data

Feb. 3, 2014   (FR) .................................. 14 00300

(51) Int. Cl.
*G01D 11/00* (2006.01)
*G01B 21/00* (2006.01)
(Continued)

(52) U.S. Cl.
CPC ............... *G01D 11/00* (2013.01); *G01B 5/12* (2013.01); *G01B 5/20* (2013.01); *G01B 5/25* (2013.01); *G01B 21/00* (2013.01)

(58) Field of Classification Search
CPC ... G01B 5/12; G01B 5/20; G01B 5/25; G01B 21/00; G01D 11/00
See application file for complete search history.

(56) References Cited

U.S. PATENT DOCUMENTS 2,799,091 A * 7/1957 Morse ...................... G01B 5/12
33/501.09
3,167,866 A * 2/1965 Steineman ......... B23Q 17/2258
33/520
(Continued)

FOREIGN PATENT DOCUMENTS

GB         167 869 A     8/1921
GB         2 200 456 A   8/1988

OTHER PUBLICATIONS

French Preliminary Search Report of FR 1400300, dated Sep. 30, 2014.

*Primary Examiner* — Peter Macchiarolo
*Assistant Examiner* — Natalie Huls
(74) *Attorney, Agent, or Firm* — Sughrue Mion, PLLC

(57) ABSTRACT

A measuring tool (1) for measuring dimensional characteristics (D) of a production part (2). The tool (1) comprises a unit (3a, 3b) for positioning the measuring tool (1) relative to the part (2) and at least one measuring apparatus (4a, 4b) mechanically linked to the positioning unit (3a, 3b) by a mechanical link (5). The positioning unit (3a, 3b) comprises a first centring device (6a) for coming into contact against an inner surface (7a) of a first bore (22a1) of the production part (2) and a second centring device (6b) for coming into contact against an inner surface (7b) of a second bore (22b1) of the production part (2), the first and second bores (22a1, 22b1) being coaxial. The mechanical link (5) allows the relative displacement of the measuring apparatus (4a, 4b) relative to the first and second centring devices (6a, 6b).

11 Claims, 3 Drawing Sheets

(51) Int. Cl.
 G01B 5/12 (2006.01)
 G01B 5/20 (2006.01)
 G01B 5/25 (2006.01)

(56) References Cited

U.S. PATENT DOCUMENTS

| | | | | |
|---|---|---|---|---|
| 3,534,480 A * | 10/1970 | Whisenant | ............ | G01B 5/245 |
| | | | | 279/2.03 |
| 4,231,161 A * | 11/1980 | Belfiore | ................ | G01B 5/25 |
| | | | | 29/271 |
| 4,338,726 A * | 7/1982 | Swailes | ................ | G01B 5/25 |
| | | | | 33/517 |
| 4,790,079 A * | 12/1988 | Meyers | ................ | G01B 5/25 |
| | | | | 33/517 |
| 5,095,634 A * | 3/1992 | Overlach | ............ | G01B 5/003 |
| | | | | 33/543 |
| 5,727,327 A * | 3/1998 | Wakabayashi | .......... | G01B 5/12 |
| | | | | 33/520 |
| 6,209,217 B1 * | 4/2001 | Tsuruta | ................ | G01B 5/20 |
| | | | | 33/551 |
| 2014/0283402 A1 * | 9/2014 | Hidaka | ................ | G01B 5/20 |
| | | | | 33/556 |
| 2016/0178342 A1 * | 6/2016 | Boisson | ............... | G01B 11/16 |
| | | | | 33/613 |

* cited by examiner

MEASURING DIMENSIONAL CHARACTERISTICS OF A PRODUCTION PART

BACKGROUND OF THE INVENTION

The invention relates to the field of measuring dimensional characteristics of a production part.

Production lines produce parts called production parts. In order to comply with the dimensioning of the production parts, certain dimensions of the production part are measured using measuring tools.

Thus, the invention relates to a measuring tool for measuring dimensional characteristics of a production part, this tool comprising:
- means for positioning the measuring tool relative to the production part; and
- at least one measuring apparatus mechanically linked to the positioning means by mechanical link means between said at least one measuring apparatus and the positioning means.

OBJECT OF THE INVENTION

One object of the present invention is to provide a measuring tool that can easily be positioned relative to a production part to be able to measure at least one dimensional characteristic of the production part.

SUMMARY OF THE INVENTION

To address this object, there is proposed, according to the invention, a measuring tool for measuring dimensional characteristics of a production part, this tool comprising:
- means for positioning the measuring tool relative to the production part;
- at least one measuring apparatus mechanically linked to the positioning means by mechanical link means between said at least one measuring apparatus and the positioning means.

This tool according to the invention is mainly characterized in that the means for positioning the measuring tool comprise:
- first centring means of the tool suitable for coming into contact against an inner surface of a first, preferentially cylindrical, bore of the production part;
- second centring means of the tool suitable for coming into contact against an inner surface of a second, preferentially cylindrical, bore of the production part, these first and second bores being coaxial; and in that the mechanical link means are arranged to allow the relative displacement of the measuring apparatus relative to the first and second centring means so that said at least one measuring apparatus can successively touch/trace a plurality of points of at least one of the inner surfaces of the first or second bore while these first and second centring means are in contact against the respective inner surfaces of these first and second bores and position the tool relative to the production part.

This tool can be simply positioned relative to the part by placing first and second centring means in contact against the respective first and second bores of the production part. Once this positioning is done, the first and second centring means are respectively centred on the respective first and second bores and said at least one measuring apparatus can then be displaced relative to the production part, and it can be displaced within the limit of the displacement allowed by the mechanical link means between the measuring apparatus and the tool positioning means. This displacement is such that the measuring apparatus can be displaced to successively touch/trace a plurality of points of at least one of the inner surfaces of the first or second bore of the production pat.

By virtue of these features, the measuring tool can be positioned in two distinct and mutually coaxial bores of the part which increases the accuracy of the positioning of the tool during the tracing of points of at least one of these bores.

The measuring tool according to the invention makes it possible to position the measuring apparatus with respect to the part to be able to define measurement areas in at least one of the bores of the part. An operator can thus perform measurements of dimensional characteristics of production parts by simply positioning the measuring tool on the part, and by displacing the measuring apparatus towards the tracing areas allowed by the link means between the measuring apparatus and the positioning means.

Thus, once positioned on the part, the measuring tool determines a possible measurement area making it possible to guide the operator in the tracing operation.

Ideally, the positioning means are adapted so that, when the first and second centring means are respectively centred against the first and second bores, then the measuring tool is then fixed on the production part and exclusively borne by the latter. This makes it possible to limit the possible degrees of freedom between the tool and the production part and also to limit the risk of falsifying the measurements.

The invention also relates to an assembly comprising the measuring tool according to any one of the embodiments described here and said production part. In this assembly according to the invention, the first centring means of the tool are in contact against the inner surface of the first, preferentially cylindrical, bore of the production part so as to be centred with respect to this first bore and the second centring means of the tool are in contact against the inner surface of the second, preferentially cylindrical, bore of the production part so as to be centred with respect to this second bore which is coaxial to the first bore. Moreover, still in this assembly according to the invention, said at least one measuring apparatus is placed between the first and second bores and between said first and second centring means, said mechanical link means between said at least one measuring apparatus and the positioning means being suitable for displacing the measuring apparatus between these first and second bores so that it can successively touch a plurality of points aligned in a same plane of alignment and belonging to at least one of said inner surfaces.

This assembly according to the invention makes it possible to measure dimensional characteristics of the part and consequently offers the same advantages of those stated with reference to the measuring tool according to the invention.

Still addressing the abovementioned object of the invention, the invention also relates to a method for measuring dimensional characteristics of first and second coaxial bores formed in a production part, these bores being arranged on either side of an open area of the production part and each of these bores emerging on the one hand in this open area and on the other hand at the periphery of the production part, the method comprising:

a) the positioning, relative to the production part, of the measuring tool according to any one of the embodiments described above or below, so that:
- the first centring means of the tool are in contact against an inner surface of the preferentially cylindrical first bore; that the second centring means of the tool are in contact against an inner surface of a preferentially cylindrical second bore; then b) the displacement of the measuring apparatus relative to the production part while this measuring apparatus is linked to the positioning means by said mechanical link means and while the first and second centring means are fixedly positioned relative to the production part, this displacement being such that the tracing means belonging to said at least one measuring apparatus touch/trace a succession of points belonging to one of the inner surfaces of the first or second bore, these touched/traced points extending in a same tracing plane.

Depending on the case, this tracing plane is parallel or at right angles to the guiding axis. In this case:
  if the apparatus is displaced relative to the part and to the first and second centring means by sliding along the guiding axis, then the tracing plane is parallel to this guiding axis;
  if the apparatus is displaced relative to the part and to the first and second centring means by pivoting about the guiding axis, then the tracing plane is at right angles to the guiding axis.

BRIEF DESCRIPTION OF THE DRAWINGS

Other features and advantages of the invention will emerge clearly from the following description, given as an indication and in a nonlimiting manner, with reference to the attached drawings, in which:

FIG. 1c is a view in longitudinal cross section of the tool according to the invention illustrated in FIG. 1a;

DETAILED DESCRIPTION OF THE INVENTION

Figure 1A:
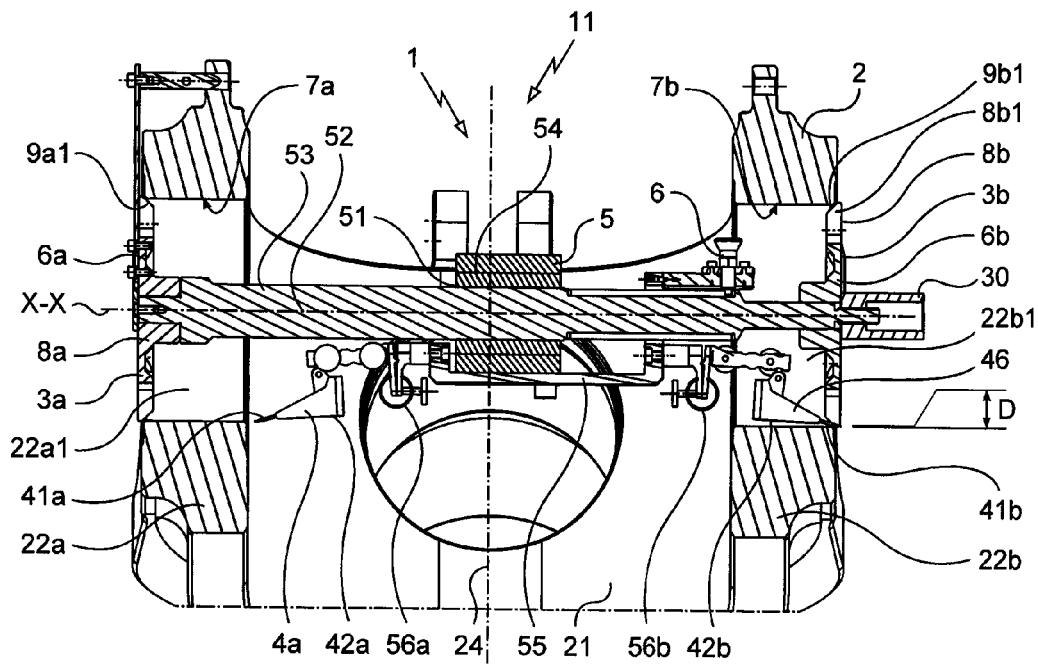
FIG. 1a describes a view in transverse cross section of the assembly according to the invention which comprises a production part for which dimensional characteristics are to be measured and a tool for measuring these characteristics.

As indicated previously, there is proposed, according to the invention, a measuring tool 1 for measuring dimensional characteristics D of a production part 2. In this case, the production part 2 is a main rod of an aircraft landing gear formed by a tube, at one end of which extends a fork with two branches 22a, 22b. These branches 22a, 22b each have a bore 22a1, 22b1 to allow the passage of a rocker arm pivot of the landing gear.

It will also be noted that each bore 22a1, 22b1 emerges on either side of the branch 22a, 22b in which it is produced, that is to say that it emerges on one side in the open area 21 situated between the branches 22a, 22b and on the other hand at the periphery 23 of the part 2. These bores 22a1, 22b1 are mutually coaxial and extend along an axis X-X which is at right angles to a main axis 24 according to which the production part 2 extends. It will be noted that the main axis 24 is the axis along which the tube of the part 2 extends.

Figure 1C:
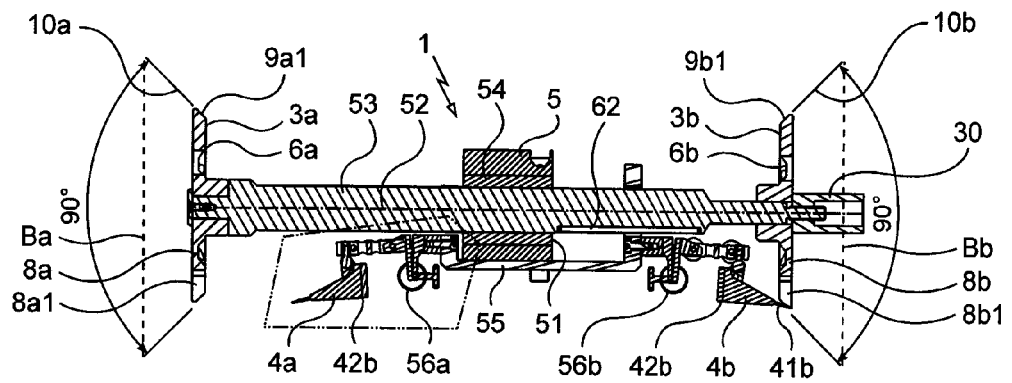
Figure 1D:
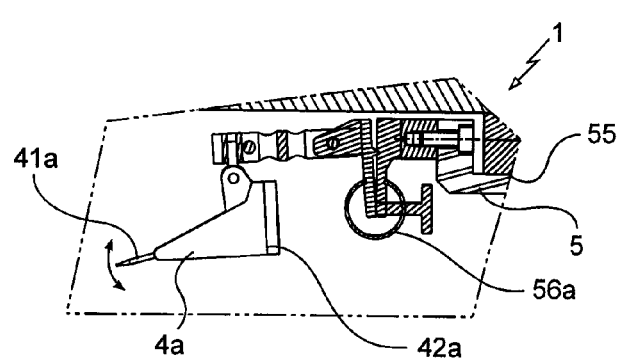
FIG. 1d is a detail view of a part of the mechanical means used to link a measuring apparatus to the positioning means of the tool relative to the production part.
Figure 1B:
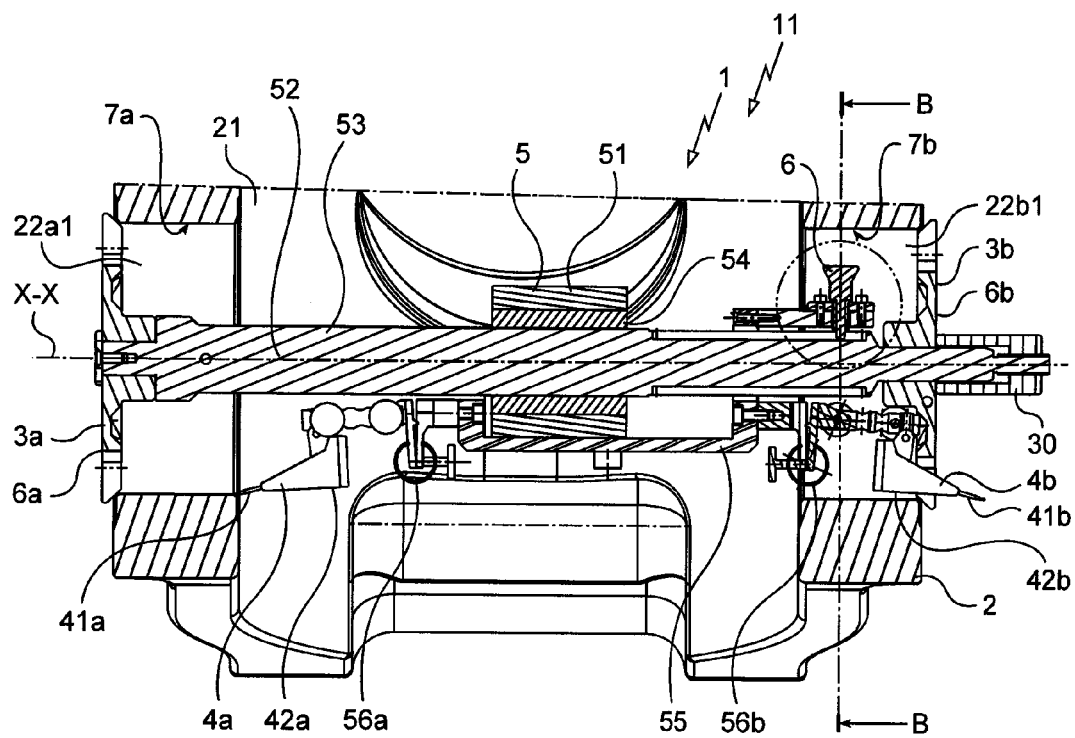
FIG. 1b is a view in longitudinal cross section of the assembly illustrated in figure la when the measuring apparatuses have been translated along a guiding axis and pivoted about this guiding axis to touch/trace different points of bores of the part.

As will be seen in FIGS. 1a, 1b, 1c, the measuring tool 1 according to the invention has:
  positioning means 3a, 3b for positioning the tool relative to the production part 2;
  two measuring apparatuses 4a, 4b mechanically linked to the positioning means by mechanical link means between these measuring apparatuses 4a, 4b and the positioning means 3a, 3b.

Each of these measuring apparatuses 4a, 4b is known as a comparator and is arranged to measure a relative displacement of a mechanical tracer relative to a comparator body 42a, 42b.

The positioning means 3a, 3b for positioning the measuring tool 1 comprise:
  first centring means 6a suitable for coming into contact against the annular inner surface 7a of the preferentially cylindrical first bore 22b1 of the production part 2; and
  second centring means 6b suitable for coming into contact against the annular inner surface 7b of the preferentially cylindrical second bore 22b2 of the production part 2.

The first centring means 6a have a first bearing part 8a provided with bearing surfaces 9a1, 9a2 arranged to be able to come to bear against the inner surface 7a of said first bore 22b1.

Similarly, the second centring means 6b have a second bearing part 8b provided with bearing surfaces 9b1 arranged to come to bear against the annular inner surface 7b of the second bore 22b2.

In this case, the first bearing part 8a comprises a plurality of bearing surfaces 9a1, 9a2 belonging to a same first frustum 10a formed by this first part 8a. Similarly, the second bearing part 8b comprises a plurality of bearing surfaces 9b1 belonging to a same second frustum 10b coaxial to the first frustum. These first and second bearing parts 8a, 8b are oriented relative to one another in such a way as to be arranged between the respective bases Ba, Bb of the first and second frustums 10a, 10b.

The first bearing part 8a has peripheral cut-outs 8a1 arranged between at least some of the bearing surfaces 9a1, 9a2, these cut-outs 8a1 are arranged at the periphery of this first part 8a so as to allow the passage, through at least some of these cut-outs 8a1, of a mechanical tracer 41a belonging to the first measuring apparatus 4a.

Similarly, the second bearing part 8b has peripheral cut-outs 8b1 arranged between some of the bearing surfaces 9b1, these cut-outs 8b1 are arranged at the periphery of this second part 8b so as to allow the passage, through at least some of these cut-outs 8b1, of a mechanical tracer 41b belonging to the second measuring apparatus 4b.

Practically, each first or second bearing part 8a, 8b has the form of a disc having an annular chamfer extending according to a bearing frustum 10a, 10b. The peripheral cut-outs

8a1, 8b1 all preferentially have the same form and are distributed uniformly at the periphery of the disc in such a way that each cut-out is placed between two chamfered portions of the disc. Through this form, each bearing surface 9a, 9a2, 9b1 of a disc extends according to a frustum allowing the bearing part 8a, 8b to be centred relative to the corresponding bore 22a1, 22b1. In effect, when the tapered bearing surface 9a1, 9a2, 9b1 of the bearing part 8a, 8b is forced against the corresponding inner surface 7a, 7b of the bore 22a1, 22b1 of the part, it tends to position the disc in such a way that its centre becomes coaxial to the axis X-X of the bore. In this case, each bearing part comes into contact and is centred against a circular base belonging to the inner surface 7a, 7b of the bore 22a1, 22b1 which corresponds to it.

To allow for this centring the means 3a, 3b for positioning the measuring tool 1 comprise clamping means arranged to exert a clamping force of the first and second bearing parts 8a, 8b so that the production part 2 can be clamped between these first and second bearing parts 8a, 8b while these first and second bearing parts are respectively bearing against the inner surfaces 7a, 7b of the corresponding first and second bores 22a1 and 22b1.

Here, the clamping means comprise a rod 53 extending between the bearing parts 8a, 8b in the form of a disc, this rod extending at right angles to the planes along which extend these bearing parts which are mutually parallel and coaxial. This clamping rod 53 passes through the respective centres of these discs of the bearing parts 8a, 8b. The first bearing part 8a is linked to the rod of the clamping means by a built-in link. By contrast, the second bearing part 8b is linked to the rod 53 by a slider link so that this second bearing part 8b can slide relative to an end portion of the rod 53. The end of this rod of the clamping means on which the second bearing part 8b slides is partly threaded to receive a nut 30 making it possible to clamp, with the aid of the rod, the production part 2 between the first and second bearing parts 8a, 8b.

The mechanical link means 5 between the measuring apparatuses 4a, 4b and the positioning means 3a, 3b comprise a guide 51 defining a guiding axis 52 arranged to guide the displacement of said at least one measuring apparatus 4a, 4b along the guiding axis 52 and/or to rotationally guide the displacement of the measuring apparatus or apparatuses 4a, 4b about said guiding axis 52. The guiding axis 52, here formed by a cylindrical outer profile of the rod 53, is coaxial to the first and second frustums 10a, 10b, which makes it possible to have a guiding axis 52 substantially coaxial to the axis X-X of the bores 22a1, 22b1. This guide 51 is here formed by the central portion of the clamping rod 53 which is cylindrical and straight.

The mechanical link means 5 comprise a sleeve 54 suitable for sliding along the guiding axis 52 and for pivoting about this guiding axis 52. This sleeve 54 is a sort of bearing fitted relative to the straight cylindrical rod 53 so as to guide the sleeve 54 so that it slides and rotates along and about this guiding rod and between the first and second bearing parts 8a, 8b.

A plate 55, to which are joined the bodies 42a, 42b of the measuring apparatuses 4a, 4b, is itself fixedly linked to this sleeve 54 and to a rotational indexing means 6.

The indexing means 6 are arranged to rotationally index said at least one measuring apparatus 4a, 4b about the guiding axis 52 while allowing it to slide along this said guiding axis 52 so that the measuring apparatus can touch/trace a plurality of points of the inner surface of the corresponding bore 22a1, 22b1. It will be noted that, by virtue of these indexing means, the points touched/traced are thus mutually aligned and are placed in a same plane of orientation in which the guiding axis extends. The mechanical link means 5 are thus arranged to allow the relative displacement of each of the measuring apparatuses 4a, 4b relative to the first and second centring means so that each at least one measuring apparatus 4a, 4b can successively touch/trace a plurality of points of at least one of the inner surfaces 7a, 7b while these first and second centring means 6a, 6b are in contact against these respective inner surfaces and position the tool 1 relative to the production part 2. The indexing means make it possible to produce an indexing such that the tracing means of the measuring apparatuses can pass through cut-outs 8a1, 8b1 without risking coming into contact against the bearing parts 8a, 8b. The risks of damage to the apparatuses 4a, 4b are thus avoided.

To understand the invention, the concept of tracing performed by a measuring apparatus 4a, 4b on a surface 7a, 7b can comprise:
- the tracing with mechanical contact, consisting in placing a mechanical tracer 41a, 41b of the measuring apparatus in contact against the surface of the part in order to measure a distance or distance variation between a touched/traced point of the surface and a reference of the measuring apparatus; and/or
- the tracing without mechanical contact, consisting in measuring the distance or the distance variation between a reference of the measuring apparatus and a traced point, using waves or signals which interfere with a point of the surface.

Figure 1E:
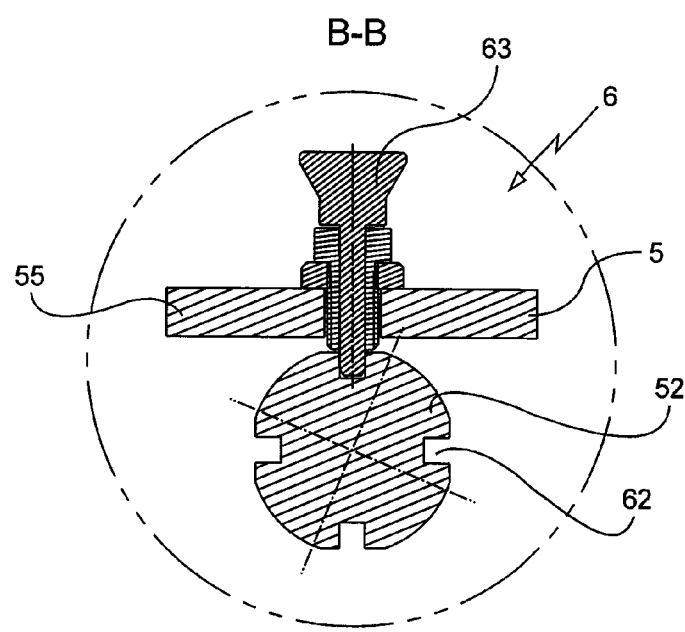
FIG. 1e is a view in transverse cross section of a portion of the measuring tool according to the invention in which can be seen position indexing means, here rotational indexing means, for rotationally indexing the measuring apparatuses relative to the production part and relative to the means for positioning the measuring tool.

The indexing means 6 are arranged to define a plurality of positions of orientation of each at least one measuring apparatus 4a, 4b relative to the guiding axis 52, these positions of orientation being arranged about the guiding axis 52. As can be seen in the cross-sectional view of FIG. 1e, the indexing means 6 comprise four longitudinal grooves 62 distributed at 90° around and along the guiding axis 52. The indexing means also comprise a rotation stopping rod 63 attached to the plate 55 and mobile relative thereto to be able to selectively penetrate into one of these grooves 62 toward which it faces.

When the operator displaces the rod 63 to insert it into one of the grooves 62, the plate and the apparatuses 4a, 4b that it bears can only slide along the axis 52 without being able to pivot about this axis 52. When the rod 63 is separated from the groove 62, the plate 55 and the apparatuses can then slide and pivot freely relative to the axis 52.

Thus, by virtue of the indexing of the measuring apparatus in one of its possible positions of orientation about the guiding axis, it is possible to delimit the tracing areas of the inner surfaces 7a, 7b accessible to the measuring apparatuses 4a, 4b. It will be noted that, for each measuring apparatus, the tracing area extends over the entire length of the bore 22a1, 22b1 which corresponds to it.

Since there are a plurality of possible indexing positions of the measuring apparatus about the guiding axis 52, the user can choose the area to be touched/traced of the chosen inner surface 7a, 7b.

The measuring tool 1 thus makes it possible to predefine a plurality of fixed orientations of the guiding apparatus relative to the bore to be touched/traced and it can be used to define a protocol of repeatable measurements on a plurality of production parts.

As illustrated in FIG. 1d, each at least one measuring apparatus 4a, 4b has an apparatus body 42a, 42b which is specific to it. The measuring tool 1 comprises two measuring apparatuses, the bodies 42a, 42b of which are mechanically linked together so that, during the displacement of one of the measuring apparatuses 4a, 4b relative to the first and second centring means 6a, 6b, all the bodies 42a, 42b of these measuring apparatuses are then displaced together relative to these first and second centring means 6a, 6b.

Each of the bodies of the measuring apparatuses is linked to the plate 55 by elastic means 56a, 56b. Each elastic means 56a, 56b is arranged to exert an elastic return force in a fixed position relative to the plate 5, of a measuring apparatus body 42a, 42b which corresponds to it. Thus, in the case of impact against a measuring apparatus, its body can be displaced relative to the plate then revert to an initial position relative to this plate 5. Here, each elastic means is produced by an open ring pressing together a portion of a body of a measuring apparatus which corresponds to it against a corresponding portion of the plate 5.

Figure 2:
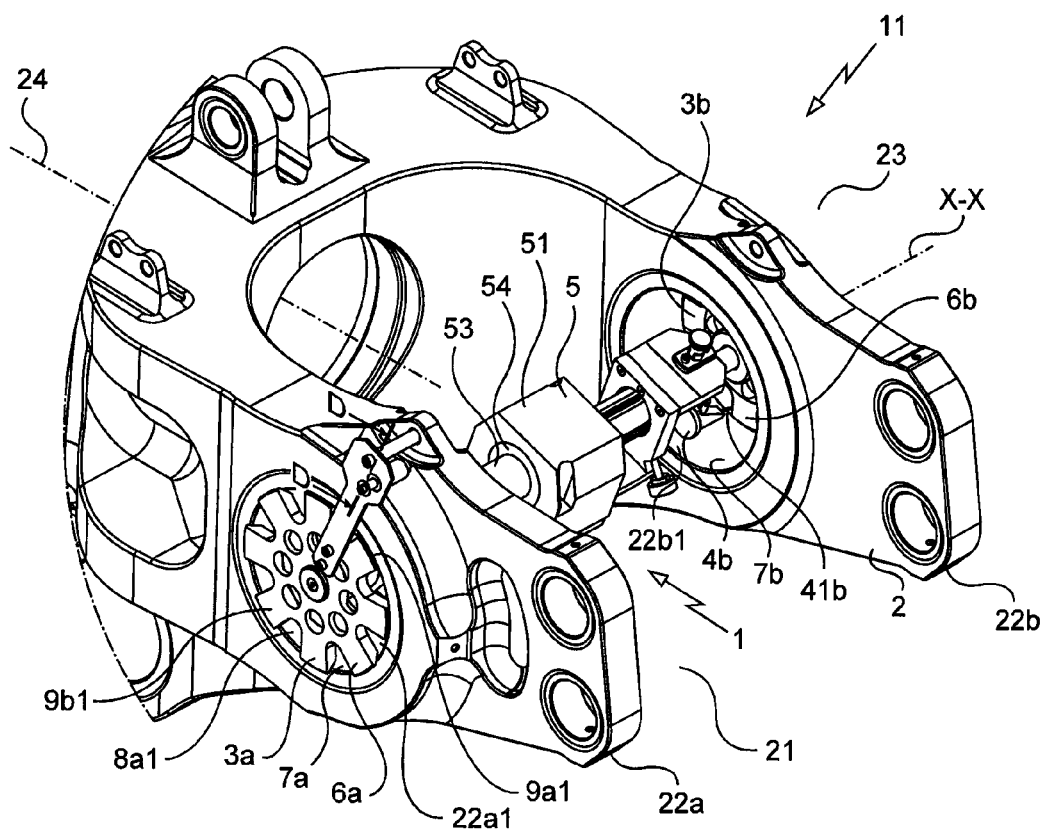
FIG. 2 is a perspective view of the assembly according to the invention with one of the measuring apparatuses arranged to touch/trace points of an inner surface of one of the coaxial and cylindrical bores produced through the production part.
Figure 2A:
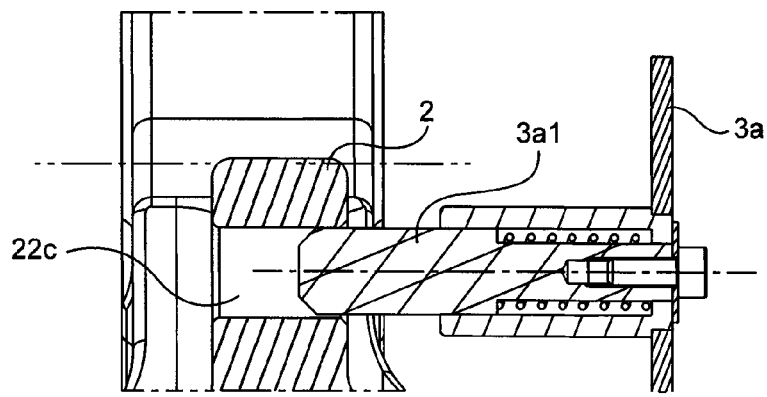
FIG. 2a is a cross-sectional view of a part of the means for positioning the measuring tool relative to the part, this part making it possible to fixedly orient the tool relative to the bores of the part.

Finally, as can be seen in particular in FIGS. 2 and the cross section D-D of FIG. 2a, the measuring tool has another indexing means 3a making it possible to rotationally index, relative to the part 2, the tool 1 and in particular its first centring means 6a. This particular indexing means 3a is produced by a rod 3a extending from the first bearing part 8a to which it is fixed, to a secondary bore 22c of the production part 2. This indexing rod 3a bears an index 3a1 mounted on a spring to slide along a sliding axis and selectively penetrate into the secondary bore 22c which is formed in the part 2 at the periphery of the first bore 22a1. Once this index 3a1 is positioned in the secondary bore 22c, the first bearing part is then fixedly oriented relative to the production part 2, which prepositions the possible tracing areas on the part.

This index 3a1 can thus serve as a polariser to predetermine a position of the tool 1 on the part 2.

One of the main dimensional characteristics that the measuring tool 1 according to the invention makes it possible to measure is the variation D of the distance between the inner surfaces 7a, 7b of at least one of the first and second cylindrical bores 22a1, 22b1 relative to the axis X-X along which these coaxial bores extend.

If the measurement of this distance variation D is performed by displacing the measuring apparatuses along a guiding axis 52 substantially parallel to the axis X-X, then the touched/traced points of the bores extend in a same plane passing through the axes 52 and X-X.

The duly measured variation D can be used to measure:
a thickness of an inner coating layer of the bore, for example by measuring the variation D observed between a point of the bore not having any coating layer and another point of the bore having this coating layer, or even by comparing measurements performed before and after the production of the laser; and/or
a parallelism of the bore surface relative to the axis X-X.

If the measurement of this distance variation D is performed by displacing the measuring apparatuses by rotation about the guiding axis 52, without these measuring apparatuses 4a, 4b being translated along this axis 52, then the touched/traced points of the bores then extend in a plane at right angles to the axes 52 and X-X.

The duly measured variation D can be used to measure:
a variation or the thickness of coating layer of the bores 22a1, 22a2; and/or
a coaxiality of respective inner surfaces 7a, 7b of the first and second bores 22a1, 22a2 relative to the axis X-X; and/or
a cylindricality of the bores 22a1, 22a2; and/or
a coaxiality between these bores 22a1 and 22b1.

Although the grooves 62 of the indexing means 6 described above are only intended to provide axial guidance along the axis 52, it is also possible to envisage having axial indexing means arranged to allow the rotation about the axis 52 while preventing the axial sliding of the measuring apparatuses relative to the axis 52. The latter mode is useful for performing a measurement over the entire periphery of a bore of the production part 2.

Finally, although the bores 22a1, 22b1 of the production part 2 described above are intended for the passage of an aircraft landing gear rocker arm pivot, it is also possible for such bores to be used for the passage of an aircraft landing gear axle.

The invention claimed is:

1. A measuring tool (1) for measuring dimensional characteristics (D) of a production part (2), the tool (1) comprising:
positioning means (3a, 3b) for positioning the measuring tool (1) relative to the production part (2);
at least one measuring apparatus (4a, 4b) mechanically linked to the positioning means (3a, 3b) by mechanical link means (5) between said at least one measuring apparatus (4a, 4b) and the positioning means (3a, 3b);
wherein the positioning means (3a, 3b) comprises:
first centring means (6a) of the tool (1) suitable for coming into contact against an inner surface (7a) of a first bore (22a1) of the production part (2);
second centring means (6b) of the tool (1) suitable for coming into contact against an inner surface (7b) of a second bore (22b1) of the production part (2), these first and second bores (22a1, 22b1) being coaxial; and
wherein the mechanical link means (5) are arranged to allow the relative displacement of the at least one measuring apparatus (4a, 4b) relative to the first and second centring means (6a, 6b) so that said at least one measuring apparatus (4a, 4b) can successively touch a plurality of points of at least one of the inner surfaces (7a, 7b) of the first or second bore (22a1, 22b1) while these first and second centring means (6a, 6b) are in contact against the respective inner surfaces (7a, 7b) of these first and second bores and position the tool (1) relative to the production part (2).

2. The measuring tool (1) according to claim 1, in which:
the first centring means (6a) have a first bearing part (8a) provided with bearing surfaces (9a1, 9a2) arranged to be able to come to bear against the inner surface (7a) of said first bore (22a1);
the second centring means (6b) have a second bearing part (8b) provided with bearing surfaces (9b1) arranged to be able to come to bear against the inner surface (7b) of said second bore (22b1);
the positioning means (3a, 3b) comprising clamping means (30) arranged to be able to exert a clamping force of the first and second bearing parts (8a, 8b) so that the production part (2) can be clamped between these first and second bearing parts (8a, 8b) while these first and second bearing parts (8a, 8b) are respectively bearing against the inner surfaces (7a, 7b) of the first and second bores (22a1, 22b1).

3. The measuring tool according to claim 2, in which,
the first bearing part (8a) comprises a first plurality of bearing surfaces (9a1, 9a2) belonging to a same first frustum (10a); and
the second bearing part (8b) comprises a second plurality of bearing surfaces (9b1) belonging to a same second frustum (10b) coaxial to the first frustum (10a), said first and second bearing parts (8a, 8b) being oriented relative to one another in such a way as to be arranged between respective bases (Ba, Bb) of the first and second frustums (10a, 10b).

4. The measuring tool (1) according to claim 2, in which the first bearing part (8a) has peripheral cut-outs (8a1) arranged between at least some of the first and second bearing surfaces (9a1, 9a2) of the first bearing part (8a) so as to allow the passage, through at least some of said peripheral cut-outs (8a1, 8b1), of a mechanical tracer (41a, 41b) belonging to said at least one measuring apparatus (4a, 4b).

5. The measuring tool according to claim 3, in which the guiding axis (52) is coaxial to the first and second frustums (10a, 10b) and in which the position indexing means (6) are arranged to rotationally index said at least one measuring apparatus (4a, 4b) about the guiding axis (52) while allowing it to slide along this said guiding axis (52) so that the measuring apparatus (4a, 4b) can touch a plurality of points of the inner surface (7a, 7b) of the corresponding bore (22a1, 22b1) which are mutually aligned and are placed in a same plane of orientation in which the guiding axis (52) extends.

6. The measuring tool (1) according to claim 1, in which the mechanical link means (5) between the at least one measuring apparatus (4a, 4b) and the positioning means (3a, 3b) comprise a guide (51) defining a guiding axis (52) arranged to guide the displacement of said at least one measuring apparatus (4a, 4b) along the guiding axis (52) and/or to rotationally guide the displacement of said at least one measuring apparatus (4a, 4b) about said guiding axis (52).

7. The measuring tool (1) according to claim 6, in which the mechanical link means (5) between the at least one measuring apparatus (4a, 4b) and the positioning means (3a, 3b) have position indexing means (6) for positioning said measuring apparatus (4a, 4b) relative to said guiding axis (52), said position indexing means (6) being arranged to define a plurality of positions of orientation of said at least one measuring apparatus (4a, 4b) relative to the guiding axis (52), said positions of orientation being arranged about the guiding axis (52).

8. The measuring tool according to claim 1, in which each at least one measuring apparatus (4a, 4b) has an apparatus body (42a, 42b) which is specific to it, the measuring tool (1) comprising a plurality of measuring apparatuses (4a, 4b) with bodies (42a, 42b) that are mechanically linked together so that, during the displacement of one of the measuring apparatuses (4a, 4b) relative to the first and second centring means (6a, 6b), all the bodies (42a, 42b) of the at least one measuring apparatus (4a, 4b) are displaced together relative to said first and second centring means (6a, 6b).

9. The measuring tool according to claim 8, in which the apparatus bodies (42a, 42b) of the at least one measuring apparatus (4a, 4b) are each linked to a same plate (55) by elastic means, each elastic means (56a, 56b) being arranged to exert an elastic return force in a fixed position relative to the plate (55) of the measuring apparatus body which corresponds to it.

10. An assembly (11) comprising said measuring tool (1) according to claim 1 and said production part (2), the first centring means (6a) of the measuring tool (1) being in contact against the inner surface (7a, 7b) of the first bore (22a1) of the production part (2) so as to be centred with respect to this first bore (22a1) and the second centring means (6b) of the tool (1) being in contact against the inner surface of the second bore (22b1) of the production part so as to be centred with respect to this second bore (22b1) which is coaxial to the first bore (22a1), said at least one measuring apparatus (4a, 4b) being placed between the first and second bores (22a1, 22b1) and between said first and second centring means (6a, 6b), said mechanical link means (5) between said at least one measuring apparatus (4a, 4b) and the positioning means (5) being suitable for displacing said measuring apparatus (4a, 4b) between these first and second bores (22a, 22b1) so that it can successively touch a plurality of points aligned in a same plane of alignment and belonging to at least one of said inner surfaces (7a, 7b).

11. A method for measuring dimensional characteristics of first and second coaxial bores (22a1, 22b1) formed in a production part (2), said bores (22a1, 22b1) being arranged on either side of an open area (21) of the production part (2) and each of said bores (22a1, 22b1) emerging on the one hand in said open area (21) and on the other hand at the periphery (23) of the production part (2), the method comprising:

a) the positioning, relative to the production part (2), of the measuring tool (1) according to claim 1 so that:
the first centring means (6a) of the measuring tool are in contact against an inner surface (7a) of the first bore (22a1); that
the second centring means (6b) of the measuring tool are in contact against an inner surface (7b) of a second bore (22b1); then b) the displacement of the measuring apparatus (4a, 4b) relative to the production part (2) while this measuring apparatus is still linked to the positioning means (3a, 3b) by said mechanical link means (5) and while the first and second centring means (6a, 6b) are still fixedly positioned relative to the production part (2), this displacement being such that the tracing means (41a, 41b) belonging to said at least one measuring apparatus (4a, 4b) touch a succession of points belonging to one of the inner surfaces (7a, 7b) of the first or second bore (22a1, 22b1), these touched points extending in a same tracing plane.

\* \* \* \* \*